US007515898B2

(12) United States Patent
Chin et al.

(10) Patent No.: US 7,515,898 B2
(45) Date of Patent: Apr. 7, 2009

(54) CONNECT CUSTOMIZED RING BACK TONE SERVICE ONLY AT ONE MSC WHEN INTERSYSTEM PAGE IS INVOLVED

(75) Inventors: Frances Mu-Fen Chin, Naperville, IL (US); Huixian Song, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 57 days.

(21) Appl. No.: 10/818,384

(22) Filed: Apr. 5, 2004

(65) Prior Publication Data

US 2005/0221793 A1 Oct. 6, 2005

(51) Int. Cl.
*H04M 9/00* (2006.01)
(52) U.S. Cl. ............... 455/401; 455/414.1; 455/458
(58) Field of Classification Search ........... 455/401, 455/400, 433, 414.1, 432.1, 458
See application file for complete search history.

(56) References Cited

U.S. PATENT DOCUMENTS

| 6,917,805 B1 * | 7/2005 | Jang ............... 455/433 |
| 2005/0096006 A1 * | 5/2005 | Chen et al. ............ 455/400 |

\* cited by examiner

*Primary Examiner*—Alexander Eisen
*Assistant Examiner*—Chuck Huynh

(57) ABSTRACT

Embodiments of the present method allow only one serving mobile switching center to connect an incoming call from a communication terminal to a customized ring back tone server when a called mobile terminal moves from an area of a serving mobile switching center to an area of a bordering mobile switching center. Embodiments may have the steps of: passing, by the serving mobile switching center, an indicator that indicates whether customized ring back tone service is already provided for an incoming call to a mobile terminal to all bordering mobile switching centers when intersystem page operation is in effect; saving, upon receiving the indicator by each bordering mobile switching center, the information up for later processing in each bordering mobile switching center; checking, when a respective bordering mobile switching center receives the mobile terminating call, the indicator and checking active customized ring back tone service in a profile of the mobile terminal to determine if a customized ring back tone is to be provided to the communication terminal; and connecting, if the indicator indicates that the customized return ring back tone is not already connected to the communication terminal, to the communication terminal otherwise the respective bordering mobile switching center not connecting the customized ring back tone server again to the communication terminal even if the mobile terminal has customized ring back tone service active and a profile thereof. The system implements the method.

3 Claims, 6 Drawing Sheets

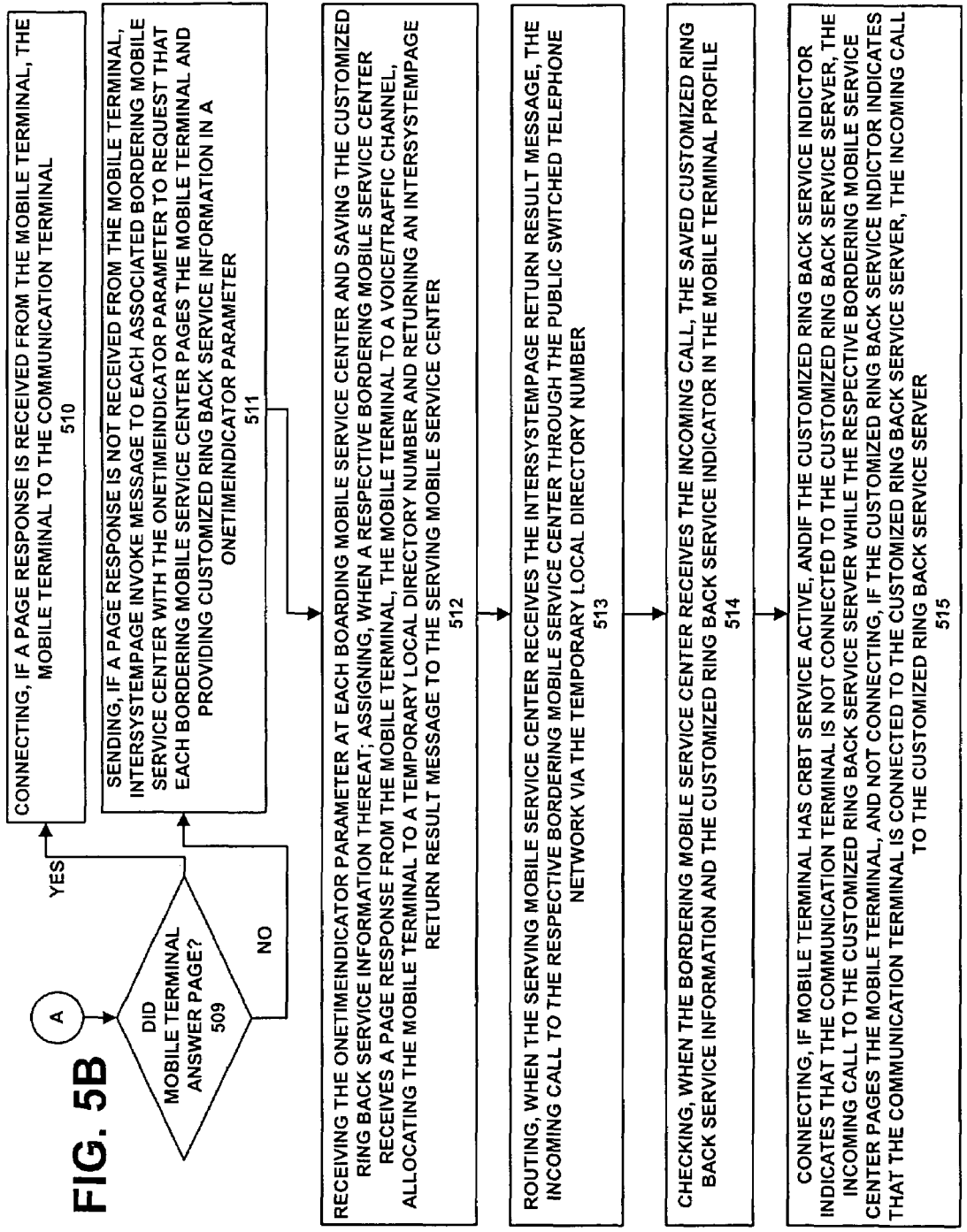

CONNECT CUSTOMIZED RING BACK TONE SERVICE ONLY AT ONE MSC WHEN INTERSYSTEM PAGE IS INVOLVED

TECHNICAL FIELD

The present invention relates generally to telephony and more particularly to a method and system that permits only one serving mobile switching center to connect an incoming call from a communication terminal to a customized ring back tone server when a called mobile terminal moves from an area of a serving mobile switching center to an area of a bordering mobile switching center.

BACKGROUND OF THE INVENTION

Ring back tones are individual audio files that take the place of the standard tones a caller hears while waiting for the phone to be answered. The possibility for users to increase the personalization of their communication experience makes ring back tones an attractive service.

The customized ring back tone is a very popular and attractive service to mobile users and wireless service providers. The mobile subscriber who purchases this service can choose whether or not a selected tone, melody, commercial message, or special sound, instead of the traditional audio ring tone, is provided to a particular caller from the time of the call setup to when the mobile terminal answers, or until "no page response" or "no answer" is detected by the system.

The choice of customized ring back tone service including selected tone, melody, commercial message, or specific sound is pre-selected on a calling party number basis through the Internet or calling a number that can reach the customized ring back tone system. For wireless service providers there are a number of approaches to provide customized ring back tone service to the caller for customized ring back tone mobile terminals based on their network configuration. In one such approach, a customized ring back tone server is connected to the caller where the call is terminated to a mobile switching center where the mobile terminal is currently located in a service area of the mobile switching center.

With this approach a call is terminated in a mobile switching center where the mobile subscriber record exists, the mobile switching center checking the called mobile terminal profile in its home location register/visitor location register record. If the called mobile terminal has customized ring back tone service active, then the serving mobile switching center connects the caller to the customized ring back tone server while it pages the called mobile terminal so that the caller hears the pre-selected customized ring back tone treatment instead of normal audible ringing tone. Hence, a decision regarding whether or not the mobile switching center connects the customized ring back tone server to the caller is based on the called mobile terminal profile in the home location register/visitor location register record, which indicates whether or not this mobile terminal has customized ring back tone service.

However, when an incoming call from a public switched telephone network to a mobile terminal arrives at a serving mobile switching center, and when the home location register determines that the call should be routed locally, the serving mobile switching center connects the caller to the customized ring back tone server while the serving mobile switching center pages the mobile terminal locally. The called mobile terminal may not respond to the local paging because it is moving into a bordering mobile service center serving area. The called mobile terminal may respond to the paging from a bordering mobile switching center, which returns a temporary local directory number to the serving mobile switching center in an Intersystem Page Return Result operation. The serving mobile switching center then delivers this call to the bordering mobile switching center via the allocated temporary local directory number while the caller is connected to the customized ring back tone server. When the bordering mobile switching center receives the call terminated to the local temporary local directory number, it connects the caller to the customized ring back tone server again based on the called mobile terminal profile. Therefore, when serving mobile switching center and the bordering mobile switching center both connect the caller to the customized ring back tone server, the caller may hear a non-coherent customer ring back tone treatment, and network resource use for customized ring back tone service is increased for that call.

Thus, it is a drawback of the prior art that there does not exist a method and apparatus that permits only one serving mobile switching center to connect an incoming call from a communication terminal to a customized ring back tone server when a called mobile terminal moves from an area of a serving mobile switching center to an area of a bordering mobile switching center.

SUMMARY

The invention in one implementation encompasses a method. Embodiments of the present method allow only one serving mobile switching center to connect an incoming call from a communication terminal to a customized ring back tone server when a called mobile terminal moves from an area of a serving mobile switching center to an area of a bordering mobile switching center. These embodiments may have the steps of: passing, by the serving mobile switching center, an indicator that indicates whether customized ring back tone service is already provided for an incoming call to a mobile terminal to all bordering mobile switching centers when intersystem page operation is in effect; saving, upon receiving the indicator by each bordering mobile switching center, the information up for later processing in each bordering mobile switching center; checking, when a respective bordering mobile switching center receives the mobile terminating call, the indicator and checking active customized ring back tone service in a profile of the mobile terminal to determine if a customized ring back tone is to be provided to the communication terminal; and connecting, if the indicator indicates that the customized return ring back tone is not already connected to the communication terminal, to the communication terminal otherwise the respective bordering mobile switching center not connecting the customized ring back tone server again to the communication terminal even if the mobile terminal has customized ring back tone service active and a profile thereof.

Another implementation of the invention encompasses a further method. This implementation of the present method allows only one serving mobile switching center to connect an incoming call to a customized ring back service server when a called mobile terminal moves to an area of a serving mobile switching center to an area of a bordering mobile switching center. This embodiment has the steps of: providing customized ring back service information in a One-TimeFeatureIndictor (OTFI) parameter, indicative of if customized ring back service is provided to an incoming call by a serving mobile switching center, to each associated bordering mobile switching center with the a request that each bordering mobile switching center pages the mobile terminal; saving the customized ring back service information by each bordering mobile switching center; assigning, when a respective bordering mobile switching center receives a page response from the mobile terminal, the mobile terminal to a voice/traffic channel, allocating the mobile terminal to a temporary local directory number and returning an InterSystemPage Return Result message to the serving mobile switching center; routing, when the serving mobile switching center receives the InterSystemPage Return Result message, the incoming call to the respective bordering mobile switching center through the public switched telephone network via the temporary local directory number; checking, when the bordering mobile switching center receives the incoming call, the saved customized ring back service information and the customized ring back service indicator in the mobile terminal profile; connecting, if the customized ring back service indictor indicates that the communication terminal is not connected to the customized ring back service server, the incoming call to the customized ring back service server while the respective bordering mobile switching center pages the mobile terminal, and not connecting, if the customized ring back service indictor indicates that the communication terminal is connected to the customized ring back service server, the incoming call to the customized ring back service server; and wherein the communication terminal receives a coherent customized ring back service treatment since the communication terminal is only connected once to the customized ring back service server.

BRIEF DESCRIPTION OF THE DRAWINGS

Features of exemplary implementations of the invention will become apparent from the description, the claims, and the accompanying drawings in which:

FIGS. 5A and 5B illustrate another flow chart of logical operational steps that may be followed in accordance with one embodiment of the present method and system.

DETAILED DESCRIPTION

The particular values and configurations discussed in these non-limiting examples can be varied and are cited merely to illustrate an embodiment of the present invention and are not intended to limit the scope of the invention.

Ringback is an intermittent audio tone that a caller in a telephone system hears after dialing a number, when the distant end of the circuit is receiving a ringing signal. The servicing switch of either the called party or the calling party can generate it. The called instrument does not generate it. Ringback is also known as the audible ringing tone, the ringback tone, and the ringtone.

The presence of ringback does not necessarily mean a distant device has been actuated. For example, if the circuit and the distant phone line are in proper working order, but no phone set or other device is connected at the called-party end, the calling party will hear ringback anyway. The absence of ringback generally indicates that the distant end of the circuit has not been contacted.

In the original usage, the ring back tone (or ring tone) is a tone returned by receiving equipment that tells a caller that the phone at that end is ringing. The tone is sent back in between the ring sequence at the receiving end. The pulsing rate is one on, two off from a 3-phase generator with each call using a single phase. The called and calling phones would not necessarily use the same phase, so if you wanted to ring someone's phone, you would need to hear it ringing for a full cycle to make sure that the phone actually rang at the other end.

Mobile phone users also use the term to mean the ring that the caller hears. The proliferation of cellular telephones in recent years has given rise to a wide variety of ring back tones. These do not necessarily follow the intermittent ringdown signal. A contemporary ring back tone might consist of several bars of a familiar musical tune, played by an audio oscillator through a small speaker. Such ring back tones are popular because, in a crowd of people with many cellular phone sets, they make it easy to tell whose phone is calling out for attention.

Figure 1:
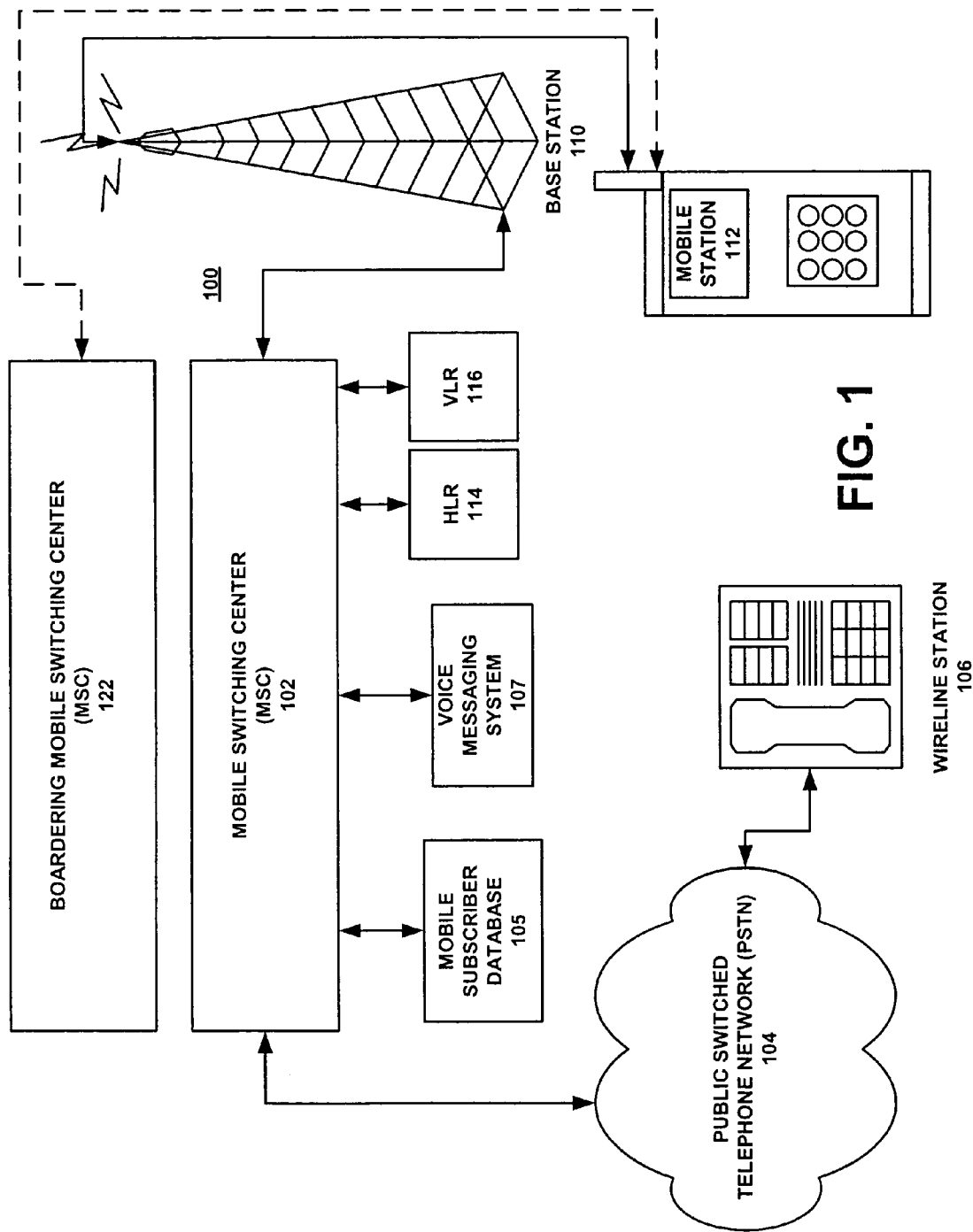
FIG. 1 depicts a block diagram illustrative of a telecommunication network for use with the present method and system.

The present method and system may be used with wireless, as well as, wired telecommunication networks. Turning to FIG. 1, an apparatus 100 in one example may have a telecommunication network 100. At least one mobile terminal 112 of a plurality of mobile terminals may be operatively connected to the telecommunication network 100. Although the present system and method may be used with any type of network (wired and wireless, for example), the subscriber may typically be a mobile subscriber who uses a mobile terminal (also referred to as mobile phone, a cell phone, mobile handset, or car phone).

As depicted in the FIG. 1 embodiment, the network (or telecommunication network) 100 may have a mobile switching center (MSC) 102. The network 100 may be, or may be part of, one or more of a telephone network, a local area network ("LAN"), the Internet, and a wireless network. In the depicted embodiment, a public switched telephone network (PSTN) 104 is connected to the MSC 102. The PSTN 104 routes calls to and from mobile users through the MSC 102. The PSTN 104 also routes calls from and to wireline stations (also referred to as communication terminals) 106. The MSC 102 may also be connected to one or more base stations (BS) 110. Each of the base stations 110 communicates with mobile terminal(s) 112 in its service area. The PSTN 104 generally may be implemented as the worldwide voice telephone network accessible to all those with telephones and access privileges (e.g., AT&T long distance network).

Each of the mobile terminals 112 may have a home location register (HLR) 114 where data about each of the mobile terminals 112 resides. Some of the mobile terminals 112 may be remotely located from their home location, and in that case, a visiting location register (VLR) 116 may be set up locally for each mobile terminal 112 that is visiting in its service area. HLR 114 may be implemented as a permanent SS7 database utilized in cellular networks, such as, but not limited to, for example, AMPS (Advanced Mobile Phone System), GSM (Global System for Mobile Communications), and PCS.

HLR 114 may be utilized generally to identify/verify a subscriber, and also may contain subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, may be implemented as a local database maintained by the cellular provider whose territory is being roamed. Mobile terminal 112 may be implemented as a cellular device, personal communication device, short message service device or wireless communications device (e.g., a wireless personal digital assistant).

The MCS 102 may have, or be operatively connected to, components of a system 105 that provides pre-defined/specified customer ring back tone to the caller. A component may be a CRBT that may be directly or indirectly connected to serving MSC. This permits only one serving mobile switching center to connect an incoming call from a communication terminal to a customized ring back tone server when a called mobile terminal moves from an area of a serving mobile switching center to an area of a bordering mobile switching center 122.

Figure 2:
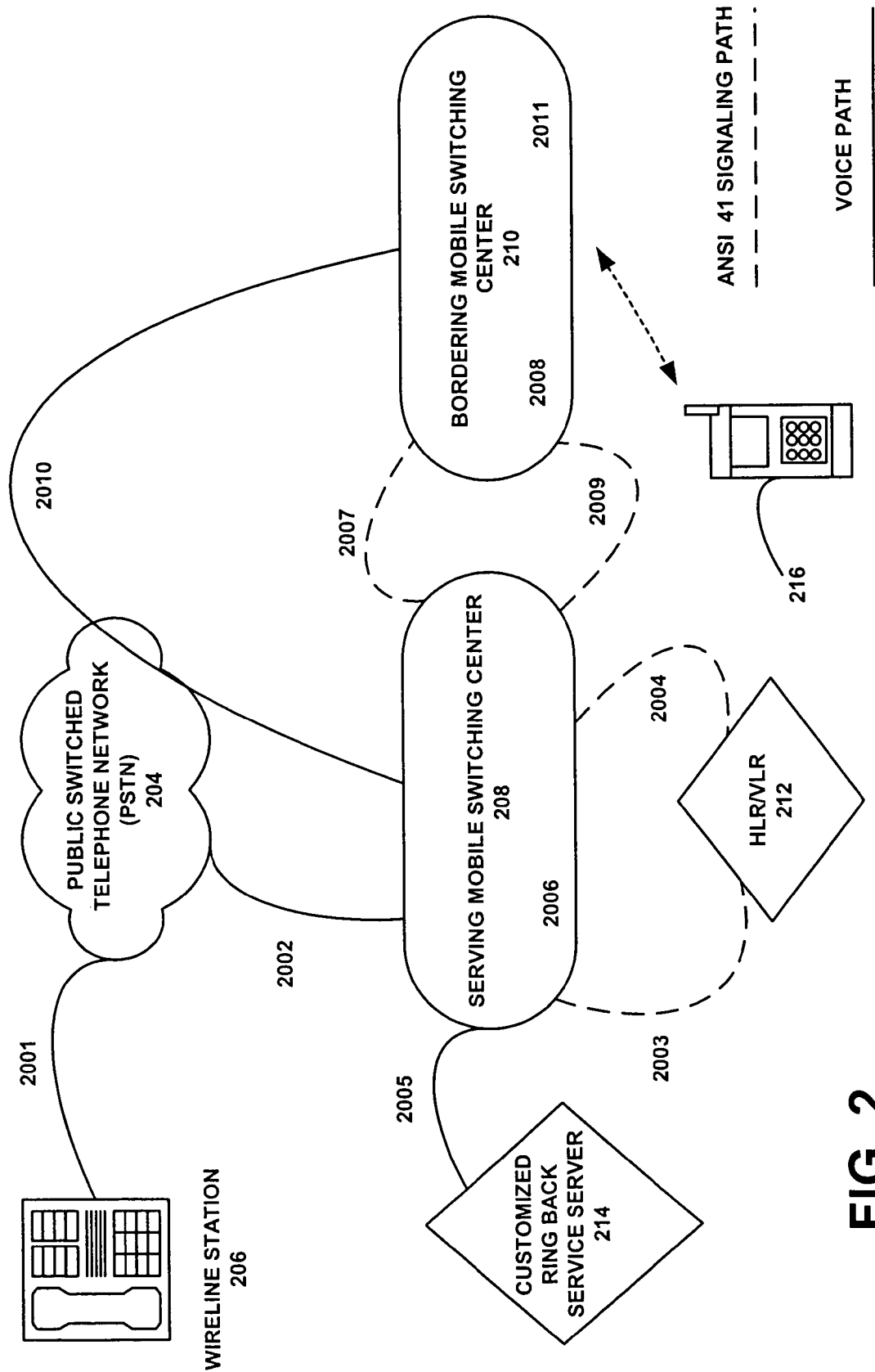
FIG. 2 depicts a diagram illustrative of one embodiment of operation of the present method and system.

Referring now to FIG. 2, one embodiment of operation of the present method and system is illustrated. A wireline station (also referred to as a communication terminal) 206 places a call to the mobile terminal 216 (path 2001).

The incoming call to the called mobile terminal 216 arrives at a serving mobile switching center 208 via a public switched telephone network 204 (path 2002).

When the serving mobile switching center 208 receives the call, it sends a query message to the home location register and visitor location register 212 (path 2003).

The home location register 212 determines that the call should be routed to a local mobile terminal, that is in the serving mobile switching center 208, that is the called mobile terminal is in the area served by the serving mobile switching center 208. It returns this information to the serving mobile switching center 208 (path 2004).

The service mobile switching center 208 checks if the called mobile terminal 216 has active customized ring back tone service in its profile at the home location register and visitor location register 212. It then connects the incoming call to an external custom ring back tone server 214 if the called mobile terminal 216 has the service active so that the caller at the communication terminal 206 hears the customized ring back tone treatment.

While the caller at the communication terminal 206 is connected to the customized ring back tone server 214, the serving mobile switching center 208 pages the mobile terminal 216 locally (at 2006).

When a page response is not received from the mobile terminal 216 at the serving mobile switching center 208 (because the mobile terminal 216 has moved into an area of a bordering mobile switching center 210), the serving mobile switching center 208 utilizes an InterSystemPage operation, that is the serving mobile switching center 208 sends an InterSystemPage Invoke message to all associated bordering mobile switching centers with OneTimeFeature Indicator parameter to request bordering mobile switching centers to page the mobile terminal 216. The OneTimeFeature Indicator parameter carries the information and indicates whether or not the customized ring back tone is played at the serving mobile switching center 208 (path 2007).

When a respective bordering mobile switching center 210 receives the InterSystemPage Invoke message, it saves the customized ring back tone information, which is received in the OneTimeFeature Indicator parameter for later processing (see 2008).

When a bordering mobile switching center 210 determines that the mobile terminal 216 is present in its service area (that is, the called mobile terminal 216 has responded to the paging), the bordering mobile switching center 210 assigns a voice and traffic channel to the mobile terminal 216, allocates a local directory telephone number to it and returns this information to the serving mobile switching center 208 in an InterSystemPage return result message (path 2009).

When the serving mobile switching center 208 receives the temporary local directory number in the InterSystemPage return result message, it routes the call to the bordering mobile switching center 210 through the public switched telephone network 204 via this allocated temporary local directory number while the incoming call is connected to the customized ring back tone server 214 (path 2010).

When the call arrives at the bordering mobile switching center 210, it checks both the customized ring back tone information that was saved earlier in the OneTimeFeature Indicator parameter of the InterSystemPage operation and the custom ring back tone service indicator in the called mobile terminal profile. If the caller at the communication terminal 206 is already connected to the customized ring back tone server 214 at the serving mobile switching center 208, the bordering mobile switching center 210 will not connect the caller to do the customized ring back service server 214. If the caller at the communication terminal 206 is not connected to the customized ring back tone server 214 and if the called mobile terminal has customized ring back tone service active in its profile, the bordering mobile switching center 210 then connects the call to the customized ring back server 214 while it pages the mobile terminal 216 (see 2011). Thus, the caller at the communication terminal 206 hears a coherent customized ring back tone treatment and the customized ring back tone server 214 is not multiply connected to the caller at the communication terminal 206.

Figure 3:
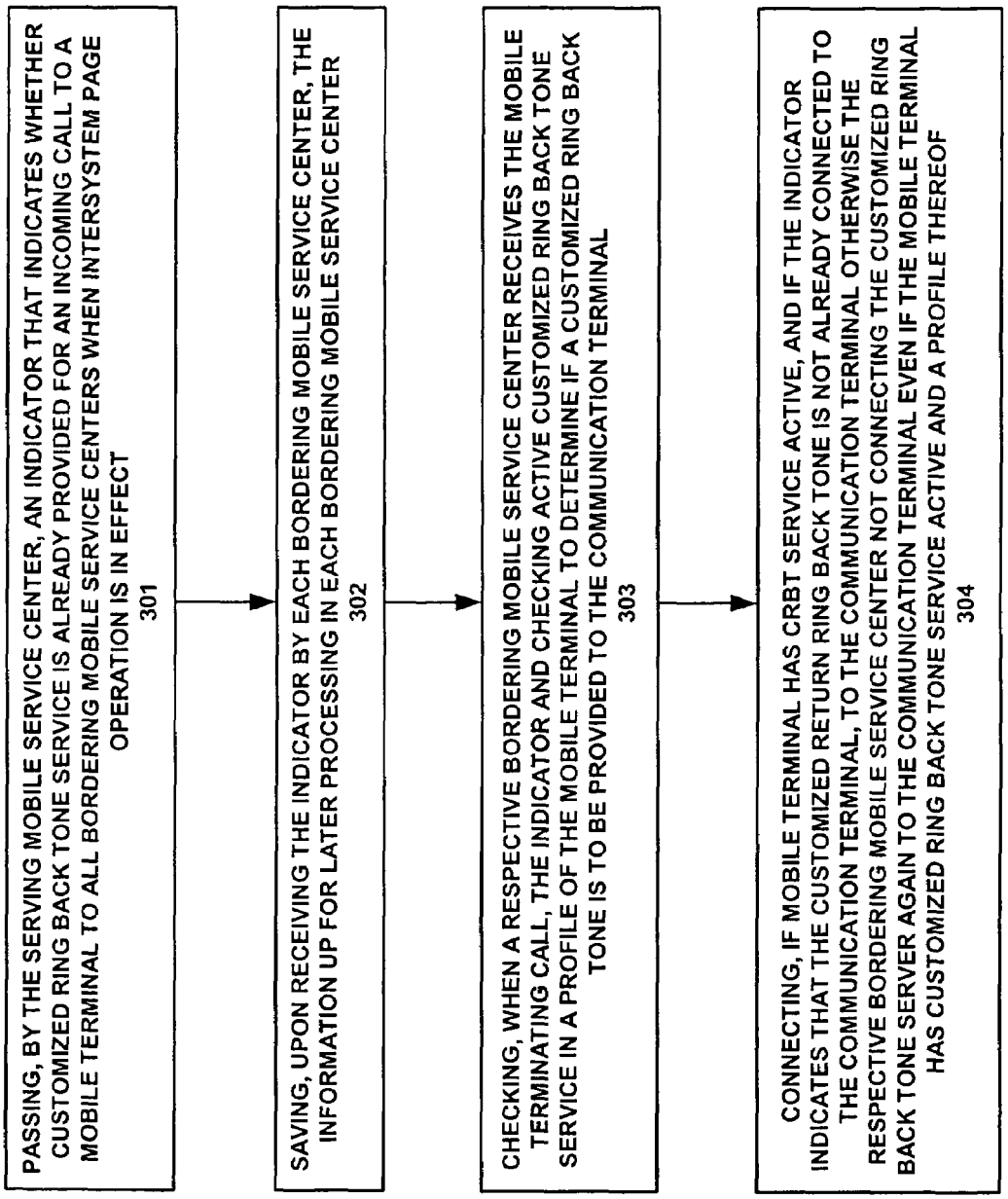
FIG. 3 illustrates a very general flow chart of logical operational steps that may be followed in accordance with one embodiment of the present method and system.

FIG. 3 is a general block diagram depicting an embodiment of the present method. The method may have the steps of: passing, by the serving mobile switching center, an indicator that indicates whether customized ring back tone service is already provided for an incoming call to a mobile terminal to all bordering mobile switching centers when intersystem page operation is in effect (step 301); saving, upon receiving the indicator by each bordering mobile switching center, the information up for later processing in each bordering mobile switching center (step 302); checking, when a respective bordering mobile switching center receives the mobile terminating call, the indicator and checking active customized ring back tone service in a profile of the mobile terminal to determine if a customized ring back tone is to be provided to the communication terminal (step 303); and connecting, if the indicator indicates that the customized return ring back tone is not already connected to the communication terminal, to the communication terminal otherwise the respective bordering mobile switching center not connecting the customized ring back tone server again to the communication terminal even if the mobile terminal has customized ring back tone service active and a profile thereof (step 304).

Figure 4:
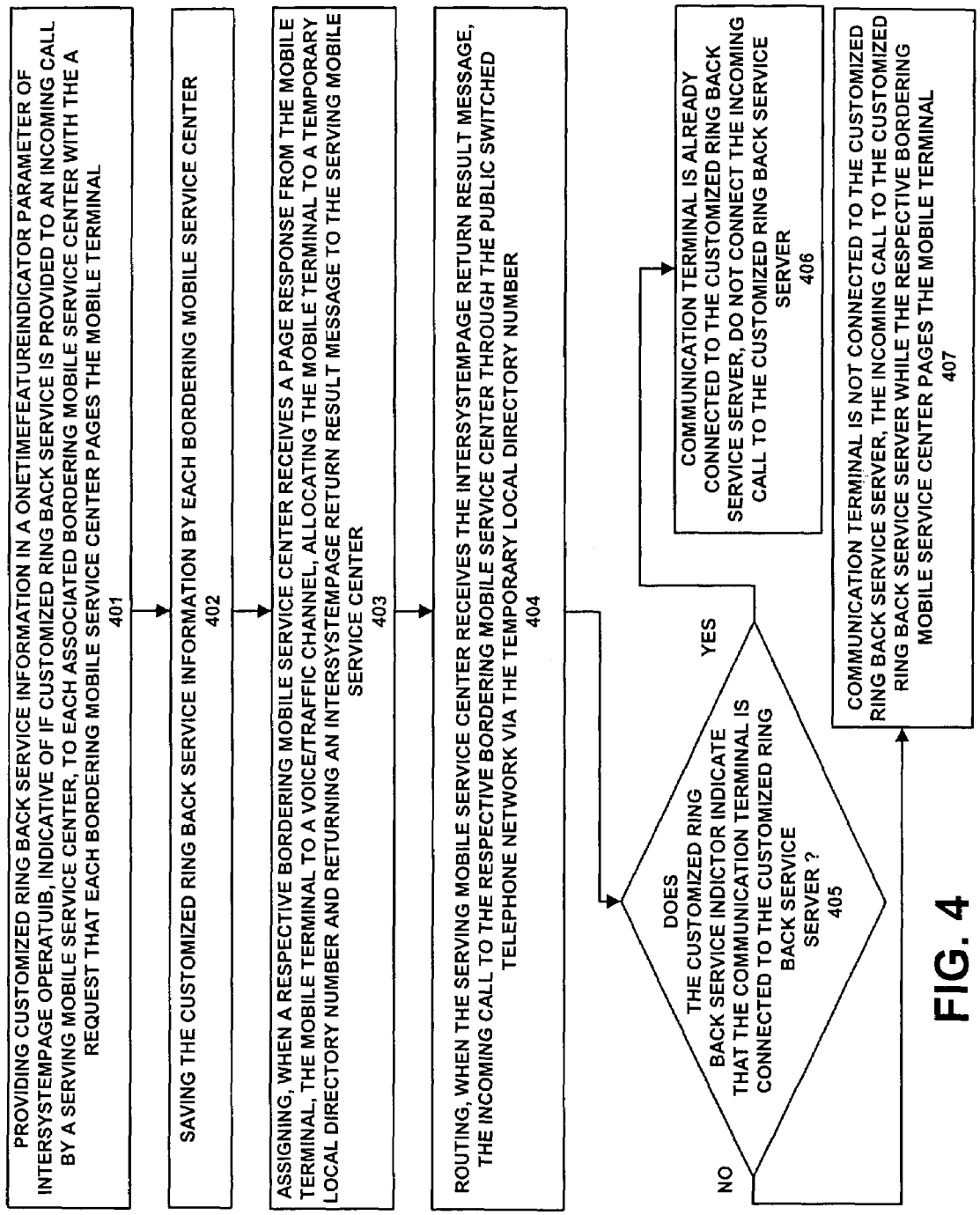
FIG. 4 illustrates another flow chart of logical operational steps that may be followed in accordance with one embodiment of the present method and system.

FIG. 4 is a block diagram depicting another embodiment of the present method in general terms. This embodiment of the method may have the steps of: providing customized ring back service information in a OneTimeFeatureIndictor parameter, indicative of if customized ring back service is provided to an incoming call by a serving mobile switching center, to each associated bordering mobile switching center with an InterSystemPage operation request that each bordering mobile switching center pages the mobile terminal (step 401); saving the customized ring back service information by each bordering mobile switching center (step 402); assigning, when a respective bordering mobile switching center receives a page response from the mobile terminal, the mobile terminal to a voice/traffic channel, allocating the mobile terminal to a temporary local directory number and returning an InterSystemPage Return Result message to the serving mobile switching center (step 403); routing, when the serving mobile switching center receives the InterSystemPage Return Result message, the incoming call to the respective bordering mobile switching center through the public switched telephone network via the temporary local directory number (step 404); does the customized ring back service indictor indicate that the communication terminal is connected to the customized ring back service server (step 405); not connecting, if the customized ring back service indictor indicates that the communication terminal is connected to the customized ring back service server, the incoming call to the customized ring back service server (step 406); and connecting, if the customized ring back service indictor indicates that the communication terminal is not connected to the customized ring back service server, the incoming call to the customized ring back service server while the respective bordering mobile switching center pages the mobile terminal (407). Thus, the communication terminal receives a coherent customized ring back service treatment since the communication terminal is only connected once to the customized ring back service server.

Figure 5A:
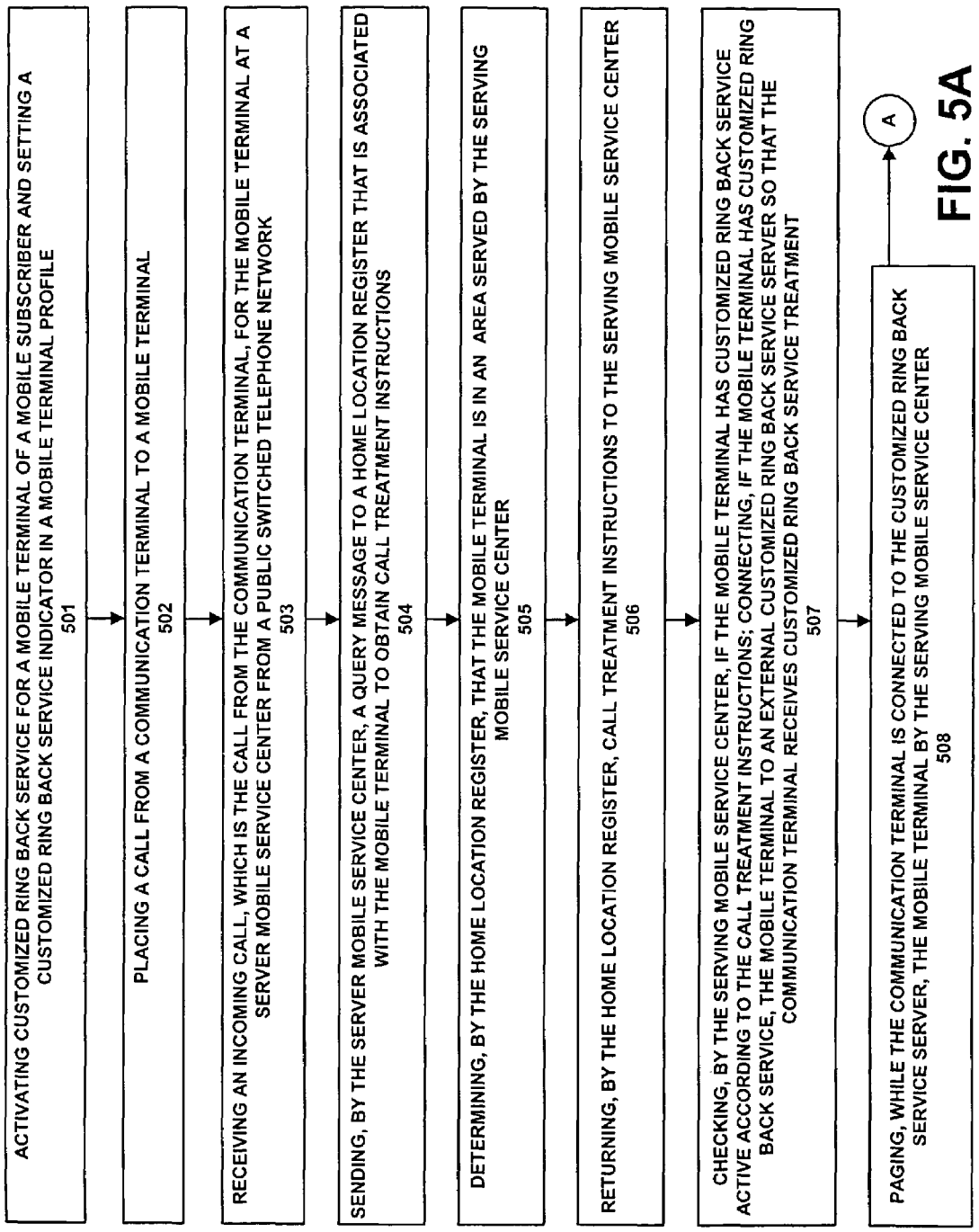

FIGS. 5A and 5B depict a block diagram of another embodiment of the present method. This embodiment of the method may have the steps of: activating customized ring back service for a mobile terminal of a mobile subscriber and setting a customized ring back service indicator in a mobile terminal profile (step 501); placing a call from a communication terminal to a mobile terminal (step 502); receiving an incoming call, which is the call from the communication terminal, for the mobile terminal at a server mobile switching center from a public switched telephone network (step 503); sending, by the server mobile switching center, a query message to a home location register that is associated with the mobile terminal to obtain call treatment instructions (step 504); determining, by the home location register, that the mobile terminal is in an area served by the serving mobile switching center (step 505); returning, by the home location register, call treatment instructions to the serving mobile switching center (step 506); checking, by the serving mobile switching center, if the mobile terminal has customized ring back service active according to the call treatment instructions; connecting, if the mobile terminal has customized ring back service, the mobile terminal to an external customized ring back service server so that the communication terminal receives customized ring back service treatment (step 507); paging, while the communication terminal is connected to the customized ring back service server, the mobile terminal by the serving mobile switching center; (step 508); checking if mobile terminal answered page (step 509); connecting, if a page response is received from the mobile terminal, the mobile terminal to the communication terminal (step 510); sending, if a page response is not received from the mobile terminal, InterSystemPage Invoke message to each associated bordering mobile switching center with the OneTimeFeatureIndictor parameter to request that each bordering mobile switching center pages the mobile terminal, and providing customized ring back service information in a OneTimeFeatureIndictor parameter (step 511); receiving the OneTimeFeatureIndictor parameter at each boarding mobile switching center and saving the customized ring back service information thereat; assigning, when a respective bordering mobile switching center receives a page response from the mobile terminal, the mobile terminal to a voice/traffic channel, allocating the mobile terminal to a temporary local directory number and returning an InterSystemPage Return Result message to the serving mobile switching center (step 512); routing, when the serving mobile switching center receives the InterSystemPage Return Result message, the incoming call to the respective bordering mobile switching center through the public switched telephone network via the temporary local directory number (step 513); checking, when the bordering mobile switching center receives the incoming call, the saved customized ring back service information and the customized ring back service indicator in the mobile terminal profile (step 514); connecting, if mobile terminal has CRBT service active, and if the customized ring back service indictor indicates that the communication terminal is not connected to the customized ring back service server, the incoming call to the customized ring back service server while the respective bordering mobile switching center pages the mobile terminal, and not connecting, if the customized ring back service indictor indicates that the communication terminal is connected to the customized ring back service server, the incoming call to the customized ring back service server (step 515).

Embodiments of the present method and system further overcome the drawbacks of the prior art by allowing the serving mobile switching center to pass an indicator to all bordering mobile switching centers, the indicator indicating whether or not the customized ring back tone service is already provided for the terminating call. When the bordering mobile switching centers receive this indicator, they save this information for later processing. The respective bordering mobile switching center that receives the mobile terminating call checks this indicator and the customized ring back tone service indication in the mobile terminal profile to determine whether or not the customized ring back tone needs to be provided to the caller. If the indicator indicates that the customized ring back tone is already connected to the caller, then the bordering mobile switching center will not connect the customized ring back tone server again, even if the called mobile terminal has customized ring back tone service active in its profile.

In one implementation for the indicator, which indicates whether or not the customized ring back tone service is already provided for the terminating call, two reserve protocol extension bits are used in the OneTimeFeatureIndicator parameter of the InterimSystemPage Invoke operation to carry this indicator from the serving mobile service center to the bordering mobile service centers. The caller will therefore hear a coherent customized ring back tone treatment, and the network resources will be utilized efficiently.

The present system and method may be used with non-mobile phones and terminals, as well as, mobile phones and mobile terminals. Also, different types of data storage devices may be used with the present method and system. For example, a data storage device may be one or more of a magnetic, electrical, optical, biological, and atomic data storage medium.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method for allowing only one mobile switching center to connect an incoming call to a customized ring back service server when a called mobile terminal moves from an area of a serving mobile switching center to an area of a bordering mobile switching center, the method comprising the steps of:

activating customized ring back service for a mobile terminal of a mobile subscriber and setting a customized ring back service indicator in a mobile terminal profile;

placing a call from a communication terminal to a mobile terminal;

receiving an incoming call, which is the call from the communication terminal, for the mobile terminal at a server mobile switching center from a public switched telephone network network;

sending, by the server mobile switching center, a query message to a home location register that is associated with the mobile terminal to obtain call treatment instructions;

determining, by the home location register, that the mobile terminal is in an area served by the serving mobile switching center;

returning, by the home location register, call treatment instructions to the serving mobile switching center;

checking, by the serving mobile switching center, if the mobile terminal has customized ring back service active according to the call treatment instructions;

connecting, if the mobile terminal has customized ring back service service, the mobile terminal to an external customized ring back service server so that the communication terminal receives customized ring back service treatment;

paging, while the communication terminal is connected to the customized ring back service server, the mobile terminal by the serving mobile switching center;

providing customized ring back service information in a OneTimeFeatureIndictor parameter;

sending, if a page response is not received from the mobile terminal, InterSystemPage Invoke message to each associated bordering mobile switching center with the OneTimeFeatureIndictor parameter to request that each bordering mobile switching center pages the mobile terminal;

receiving the OneTimeFeatureIndictor parameter at each boarding mobile switching center and saving the customized ring back service information thereat;

assigning, when a respective bordering mobile switching center receives a page response from the mobile terminal, the mobile terminal to a voice/traffic channel, allocating the mobile terminal to a temporary local directory number and returning an InterSystemPage Return Result message to the serving mobile switching center;

routing, when the serving mobile switching center receives the InterSystemPage Return Result message, the incoming call to the respective bordering mobile switching center through the public switched telephone network via the temporary local directory number;

checking, when the bordering mobile switching center receives the incoming call, the saved customized ring back service information and the customized ring back service indicator in the mobile terminal profile;

connecting, if the customized ring back service indictor indicates that the communication terminal is not connected to the customized ring back service server, the incoming call to the customized ring back service server while the respective bordering mobile switching center pages the mobile terminal, and not connecting, if the customized ring back service indictor indicates that the communication terminal is connected to the customized ring back service server, the incoming call to the customized ring back service server; and wherein the communication terminal receives a coherent customized ring back service treatment since the communication terminal is only connected once to the customized ring back service server.

2. The method according to claim 1, wherein the information in the OneTimeFeatureIndictor parameter comprise two reserved protocol extension bits in an InterSystemPage.

3. The method according to claim 1, wherein, if the indicator indicates that the customized return ring back tone is not already connected to the communication terminal, the bordering mobile switching center connects the customized ring back tone server to the communication terminal, otherwise the respective bordering mobile switching center does not connect the customized ring back tone server again to the communication terminal even if the mobile terminal has customized ring back tone service active and a profile thereof.

* * * * *